US012659083B2

(12) United States Patent
Kuo et al.

(10) Patent No.: US 12,659,083 B2
(45) Date of Patent: Jun. 16, 2026

(54) NETWORK CODING WITH HYBRID AUTOMATIC REPEAT REQUEST PROCESS

(71) Applicant: Nokia Technologies Oy, Espoo (FI)

(72) Inventors: Ping-Heng Kuo, Cambridge (GB); Hans Thomas Höhne, Espoo (FI); Ling Yu, Espoo (FI); Kalle Petteri Kela, Espoo (FI); Dawid Koziol, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 444 days.

(21) Appl. No.: 18/251,650

(22) PCT Filed: Nov. 5, 2020

(86) PCT No.: PCT/EP2020/081168
§ 371 (c)(1),
(2) Date: May 3, 2023

(87) PCT Pub. No.: WO2022/096108
PCT Pub. Date: May 12, 2022

(65) Prior Publication Data
US 2024/0014943 A1     Jan. 11, 2024

(51) Int. Cl.
*H04L 1/1812*     (2023.01)
*H04L 1/1829*     (2023.01)
(52) U.S. Cl.
CPC .......... *H04L 1/1812* (2013.01); *H04L 1/1835* (2013.01)
(58) Field of Classification Search
None
See application file for complete search history.

(56) References Cited

U.S. PATENT DOCUMENTS

| | | | |
|---|---|---|---|
| 8,908,624 B2 | 12/2014 | Sfar et al. | |
| 2018/0359050 A1 | 12/2018 | Lauridsen et al. | |
| 2019/0149274 A1* | 5/2019 | Freda .................... | H04L 1/1819 |
| | | | 370/329 |
| 2019/0245657 A1 | 8/2019 | Lee et al. | |
| 2020/0059821 A1 | 2/2020 | Wirth et al. | |

(Continued)

FOREIGN PATENT DOCUMENTS

| | | |
|---|---|---|
| WO | 2016/119634 A1 | 8/2016 |
| WO | 2017/196968 A1 | 11/2017 |

(Continued)

OTHER PUBLICATIONS

English Translation of WO 2020197218 A1—Kang et al., Method and Apparatus for Transmitting Sidelink Data in Wireless Communication System, Oct. 1, 2020 (Year: 2020).*

(Continued)

*Primary Examiner* — Saumit Shah
(74) *Attorney, Agent, or Firm* — Barta Jones, PLLC

(57) ABSTRACT

Various example embodiments relate to generation of coded transport blocks in connection with hybrid automatic repeat request (HARQ) process(es). A device may generate a plurality of protocol data units (PDU) for transmission. The PDUs may be stored in at least one HARQ buffer. The device may determine to transmit at least one coded transport based on identifying at least two of the PDUs for generating the coded transport block(s). Apparatuses, methods, and computer programs are disclosed.

16 Claims, 8 Drawing Sheets

(56)                     References Cited

U.S. PATENT DOCUMENTS

| | | | | |
|---|---|---|---|---|
| 2021/0105086 A1* | 4/2021 | Lou | ........................ | H04W 72/23 |
| 2022/0400498 A1* | 12/2022 | Lee | ........................ | H04W 72/11 |
| 2023/0361934 A1* | 11/2023 | Miao | ..................... | H04L 1/1816 |

FOREIGN PATENT DOCUMENTS

| | | | | |
|---|---|---|---|---|
| WO | 2018/082760 A1 | 5/2018 | | |
| WO | WO-2020197218 A1 * | 10/2020 | ........... | H04W 72/23 |
| WO | 2021/028032 A1 | 2/2021 | | |
| WO | 2021/028064 A1 | 2/2021 | | |
| WO | 2021/116082 A1 | 6/2021 | | |
| WO | 2021/155947 A1 | 8/2021 | | |
| WO | 2021/220121 A1 | 11/2021 | | |

OTHER PUBLICATIONS

Paris et al., "Addressing Reliability Needs of Industrial Applications in 5G NR with Network Coding", IEEE 91st Vehicular Technology Conference (VTC2020-Spring), May 25-28, 2020, 6 pages.

Khirallah et al., "Performance analysis and energy efficiency of random network coding in LTE-advanced", IEEE Transactions on Wireless Communications, vol. 11, No. 12, Dec. 2012, pp. 4275-4285.

"Discussion on the application of Network Coding for efficient PDCP Duplication with more than 2 copies", 3GPP TSG-RAN WG3 Meeting #105, R3-194503, Agenda: 17.2.3, China Unicom, Aug. 26-30, 2019, pp. 1-3.

"Network coding for Release 17 IAB", 3GPP TSG RAN Meeting #84, R2-191346, Agenda: 8, Intel Corporation, Jun. 3-6, 2019, 8 pages.

Peng et al., "Research on network coding based Hybrid-ARQ scheme for wireless networks", IEEE International Conference on Communication Systems, Nov. 17-19, 2010, 5 pages.

Lang et al., "A Turbo-Like Iterative Decoding Algorithm for Network Coded HARQ", 9th International ITG Conference on Systems, Communication and Coding, Jan. 21-24, 2013, 6 pages.

Antonopoulos et al., "Network coding-based medium access control protocol for cooperative wireless networks", IEEE International Conference on Communications (ICC), Jun. 10-15, 2012, pp. 1933-1937.

Antonopoulos et al., "Cross-Layer Theoretical Analysis of NC-Aided Cooperative ARQ Protocols in Correlated Shadowed Environments", IEEE Transactions on Vehicular Technology, vol. 64, No. 9, Sep. 2015, pp. 4074-4087.

Woltering et al., "Performance of HARQ with Reduced Size Retransmissions Using Network Coding Principles", IEEE 77th Vehicular Technology Conference (VTC Spring), Jun. 2-5, 2013, 6 pages.

Sun et al., "Cooperative hybrid-ARQ protocol with network coding", Fourth International Conference on Communications and Networking in China, Aug. 26-28, 2009, 5 pages.

Lang et al., "Improved HARQ based on network coding and its application in LTE", IEEE Wireless Communications and Networking Conference (WCNC), Apr. 1-4, 2012, pp. 1958-1963.

"IEEE 802.11", Wikipedia, Retrieved on Jun. 2, 2023, Webpage available at : https://en.wikipedia.org/wiki/IEEE_802.11.

International Search Report and Written Opinion received for corresponding Patent Cooperation Treaty Application No. PCT/EP2020/081168, dated Jul. 16, 2021, 13 pages,.

"Physical layer procedures for NR V2X sidelink communication", 3GPP TSG RAN WG1 Meeting #97, R1-1906799, Agenda: 7.2.4.5, Intel Corporation, May 13-17, 2019, 14 pages.

* cited by examiner

410

MAC PDUs pertaining to different HARQ processes

MAC PDU1 → Network coding entity → NC-TB

MAC PDU2 →

| X | X | X | X |
| Rep 0 | Rep 1 | Rep 2 | Rep 3 |

Repetition without network coding
(Repetition mode 1)

| X | Y | C(X,Y) | D(X,Y) |

Network coding based repetiton
(Repetition mode 2, 3, or 4)

120
gNB

110
UE

701〜 ──Retransmission grant──→
(Retransmission mode and/or
HARQ PID indication)

Prepare PUSCH
transmission based
on the
702〜 retransmission
mode and/or
indicated HARQ
PID(s)

←──PUSCH transmission──〜703

HARQ PID Subset 1:
Uncoded transport blocks

HARQ PID Subset 2:
Coded transport blocks

1100

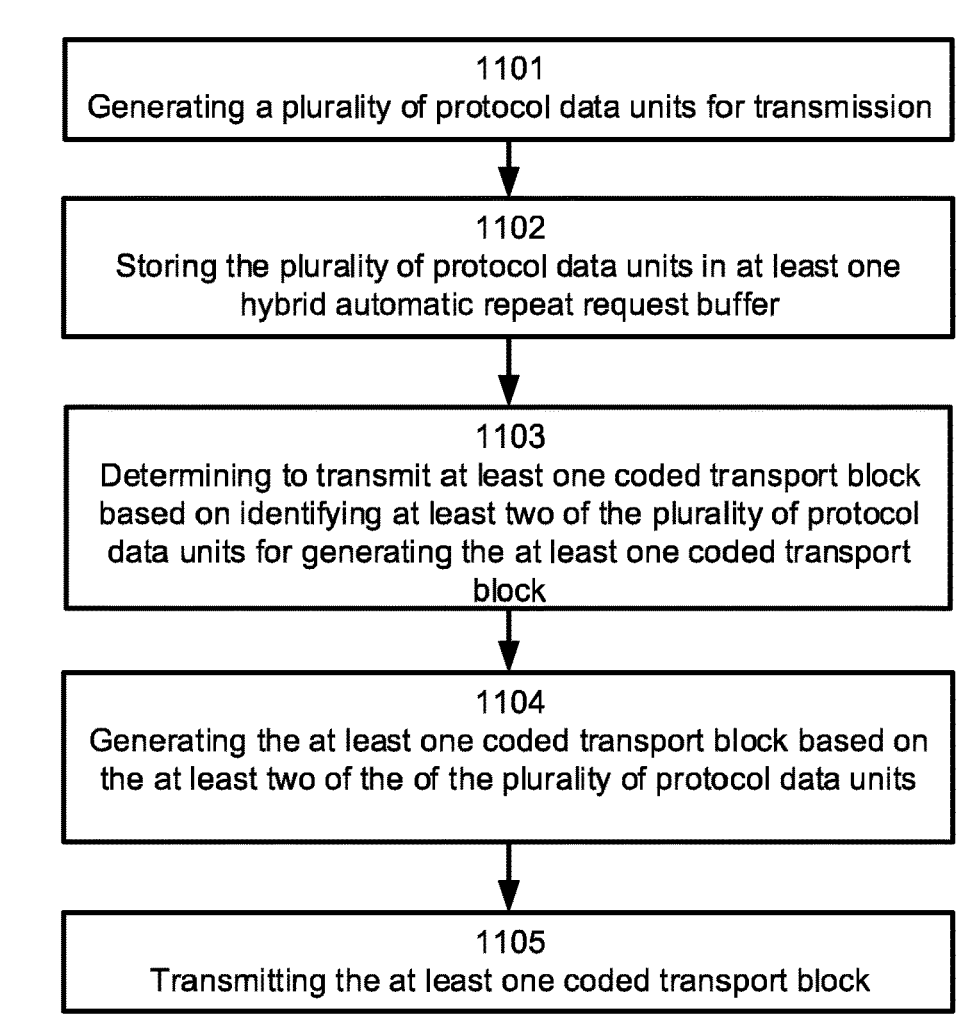

1101
Generating a plurality of protocol data units for transmission

1102
Storing the plurality of protocol data units in at least one hybrid automatic repeat request buffer 1103
Determining to transmit at least one coded transport block based on identifying at least two of the plurality of protocol data units for generating the at least one coded transport block 1104
Generating the at least one coded transport block based on the at least two of the of the plurality of protocol data units 1105
Transmitting the at least one coded transport block

1201
Receiving at least one coded transport block generated based on a plurality of protocol data units, wherein the plurality of protocol data units is associated with at least one hybrid automatic repeat request process 1202
Decoding the at least one coded transport block to obtain the plurality of protocol data units

FIG.12

NETWORK CODING WITH HYBRID AUTOMATIC REPEAT REQUEST PROCESS

RELATED APPLICATION

This application was originally filed as a Patent Cooperation Treaty Application No. PCT/EP2020/081168 filed on Nov. 5, 2020.

TECHNICAL FIELD

Various example embodiments generally relate to the field of data communications. In particular, some example embodiments relate to generation of coded transport blocks in connection with hybrid automatic repeat request (HARQ) process(es).

BACKGROUND

In various wireless communication technologies, such as 3GPP long-term evolution (LTE) 4G and 5G new radio (NR), a device such as for example a user equipment (UE) may communicate with one or more network nodes over wireless radio channels. Reliability of the communication may be improved by re-transmission of data, for example according to a HARQ process. Data communication may be based on a protocol stack comprising various communication protocols and layers such as for example a packet data convergence protocol (PDCP) layer, a radio link control (RLC) layer, a medium access control (MAC) layer, and a physical layer (PHY). HARQ functionality may be provided on the MAC layer.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments enable improving reliability and efficiency of transmission of protocol data units. This benefit may be achieved by the features of the independent claims. Further implementation forms are provided in the dependent claims, the description, and the drawings.

According to a first aspect, an apparatus may comprise at least one processor and at least one memory including computer program code, the at least one memory and the computer code configured to, with the at least one processor, cause the apparatus at least to: generate a plurality of protocol data units for transmission; store the plurality of protocol data units in at least one hybrid automatic repeat request buffer; determine to transmit at least one coded transport block based on identifying at least two of the plurality of protocol data units for generating the at least one coded transport block; generate the at least one coded transport block based on the at least two of the of the plurality of protocol data units; and transmit the at least one coded transport block.

According to an example embodiment of the first aspect, the at least one memory and the computer code may be further configured to, with the at least one processor, cause the apparatus to: receive an indication of an allocation of repetition bundle resources to the plurality of protocol data units, wherein the indication of the allocation of the repetition bundle resources indicates one of a plurality of repetition modes; and determine to transmit the coded transport block based on the indicated one of the plurality of repetition modes.

According to an example embodiment of the first aspect, the plurality of repetition modes may comprise at least one of: a first repetition mode comprising transmission of a first protocol data unit and/or a second protocol data unit without transmission of the at least one coded transport block, a second repetition mode comprising transmission of the at least one coded transport block generated based on a new transmission of the first protocol data unit and a new transmission of the second protocol data unit, a third repetition mode comprising transmission of the at least one coded transport block generated based on the new transmission of the first protocol data unit and a re-transmission the second protocol data unit, or a fourth repetition mode comprising transmission of the at least one coded transport block generated based on the re-transmission of the first protocol data unit and the re-transmission of the second protocol data unit.

According to an example embodiment of the first aspect, the first protocol data unit may be stored in a first hybrid automatic repeat request buffer and the second protocol data unit may be stored in a second hybrid automatic repeat request buffer, and/or the first protocol data unit may be associated with a first hybrid automatic repeat request process and the second protocol data unit may be associated with a second hybrid automatic repeat request process.

According to an example embodiment of the first aspect, the at least one memory and the computer code may be further configured to, with the at least one processor, cause the apparatus to: receive an identifier of the first hybrid automatic repeat request process; and/or receive an identifier of the second hybrid automatic repeat request processor.

According to an example embodiment of the first aspect, the at least one memory and the computer code may be further configured to, with the at least one processor, cause the apparatus to: receive a re-transmission grant, wherein the re-transmission grant indicates one of a plurality of re-transmission modes and at least one identifier of a hybrid automatic repeat request process associated with the re-transmission grant; and determine to transmit the at least one coded transport block based on the received re-transmission mode and the identifier of the hybrid automatic repeat request process.

According to an example embodiment of the first aspect, the plurality of re-transmission modes may comprise at least one of: a first re-transmission mode comprising re-transmission of a first protocol data unit and/or a second protocol data unit, wherein the first protocol data unit and/or the second protocol data unit is associated with the hybrid automatic repeat request process associated with the re-transmission grant, a second re-transmission mode comprising transmission of the at least one coded transport block generated based on the first protocol data unit associated with a first hybrid automatic repeat request process and the second protocol data unit associated with a second hybrid automatic repeat request process, or a third re-transmission mode comprising transmission of the at least one coded transport block generated based on the first protocol data unit associated with the hybrid automatic repeat request process and new transmission of the second protocol data unit.

According to an example embodiment of the first aspect, the at least one memory and the computer code may be further configured to, with the at least one processor, cause the apparatus to: receive a transmission grant, wherein the transmission grant indicates an identifier of a hybrid automatic repeat request process belonging to a second set of hybrid automatic repeat request process identifiers; and determine to transmit the coded transport block, in response to determining the received identifier of the hybrid automatic repeat request process to belong to the second set of hybrid automatic repeat request process identifiers.

According to an example embodiment of the first aspect, the at least one memory and the computer code may be further configured to, with the at least one processor, cause the apparatus to: generate the coded transport block based on the first protocol data unit and the second protocol data unit based on the identifier of the first hybrid automatic request process and the identifier of the second hybrid automatic request process belonging to a first set of hybrid automatic repeat request process identifiers and being linked to the second set of hybrid automatic request process identifiers.

According to an example embodiment of the first aspect, the at least one memory and the computer code may be further configured to, with the at least one processor, cause the apparatus to: transmit an indication of a repetition mode over a sidelink connection, transmit an indication of a re-transmission mode over the sidelink connection, or transmit the identifier of the hybrid automatic repeat request process associated with the first set of hybrid automatic repeat request process identifiers associated with the at least one coded transport block over the sidelink connection.

According to a second aspect, a method may comprise: generating a plurality of protocol data units for transmission; storing the plurality of protocol data units in at least one hybrid automatic repeat request buffer; determining to transmit at least one coded transport block based on identifying at least two of the plurality of protocol data units for generating the at least one coded transport block; generating the at least one coded transport block based on the at least two of the of the plurality of protocol data units; and transmitting the at least one coded transport block.

According to an example embodiment of the second aspect, the method may further comprise: receiving an indication of an allocation of repetition bundle resources to the plurality of protocol data units, wherein the indication of the allocation of the repetition bundle resources indicates one of a plurality of repetition modes; and determining to transmit the coded transport block based on the indicated one of the plurality of repetition modes.

According to an example embodiment of the second aspect, the plurality of repetition modes may comprise at least one of: a first repetition mode comprising transmission of a first protocol data unit and/or a second protocol data unit without transmission of the at least one coded transport block, a second repetition mode comprising transmission of the at least one coded transport block generated based on a new transmission of the first protocol data unit and a new transmission of the second protocol data unit, a third repetition mode comprising transmission of the at least one coded transport block generated based on the new transmission of the first protocol data unit and a re-transmission the second protocol data unit, or a fourth repetition mode comprising transmission of the at least one coded transport block generated based on the re-transmission of the first protocol data unit and the re-transmission of the second protocol data unit.

According to an example embodiment of the second aspect, the first protocol data unit may be stored in a first hybrid automatic repeat request buffer and the second protocol data unit may be stored in a second hybrid automatic repeat request buffer, and/or the first protocol data unit may be associated with a first hybrid automatic repeat request process and the second protocol data unit may be associated with a second hybrid automatic repeat request process.

According to an example embodiment of the second aspect, the method may further comprise: receiving an identifier of the first hybrid automatic repeat request process; and/or receiving an identifier of the second hybrid automatic repeat request processor.

According to an example embodiment of the second aspect, the method may further comprise: receiving a re-transmission grant, wherein the re-transmission grant indicates one of a plurality of re-transmission modes and at least one identifier of a hybrid automatic repeat request process associated with the re-transmission grant; and determining to transmit the at least one coded transport block based on the received re-transmission mode and the identifier of the hybrid automatic repeat request process.

According to an example embodiment of the second aspect, the plurality of re-transmission modes may comprise at least one of: a first re-transmission mode comprising re-transmission of a first protocol data unit and/or a second protocol data unit, wherein the first protocol data unit and/or the second protocol data unit is associated with the hybrid automatic repeat request process associated with the re-transmission grant, a second re-transmission mode comprising transmission of the at least one coded transport block generated based on the first protocol data unit associated with a first hybrid automatic repeat request process and the second protocol data unit associated with a second hybrid automatic repeat request process, or a third re-transmission mode comprising transmission of the at least one coded transport block generated based on the first protocol data unit associated with the hybrid automatic repeat request process and new transmission of the second protocol data unit.

According to an example embodiment of the second aspect, the method may further comprise: receiving a transmission grant, wherein the transmission grant indicates an identifier of a hybrid automatic repeat request process belonging to a second set of hybrid automatic repeat request process identifiers; and determining to transmit the coded transport block, in response to determining the received identifier of the hybrid automatic repeat request process to belong to the second set of hybrid automatic repeat request process identifiers.

According to an example embodiment of the second aspect, the method may further comprise: generating the coded transport block based on the first protocol data unit and the second protocol data unit based on the identifier of the first hybrid automatic request process and the identifier of the second hybrid automatic request process belonging to a first set of hybrid automatic repeat request process identifiers and being linked to the second set of hybrid automatic request process identifiers.

According to an example embodiment of the second aspect, the method may further comprise: transmitting an indication of a repetition mode over a sidelink connection, transmitting an indication of a re-transmission mode over the sidelink connection, or transmitting the identifier of the hybrid automatic repeat request process associated with the first set of hybrid automatic repeat request process identifiers associated with the at least one coded transport block over the sidelink connection.

According to a third aspect, a computer program may comprise instructions for causing an apparatus to perform at least the following: generating a plurality of protocol data units for transmission; storing the plurality of protocol data units in at least one hybrid automatic repeat request buffer; determining to transmit at least one coded transport block based on identifying at least two of the plurality of protocol data units for generating the at least one coded transport block; generating the at least one coded transport block based on the at least two of the of the plurality of protocol data units; and transmitting the at least one coded transport block. The computer program may further comprise instructions for causing the apparatus to perform any example embodiment of the method of the second aspect.

According to a fourth aspect, an apparatus may comprise means for generating a plurality of protocol data units for transmission; storing the plurality of protocol data units in at least one hybrid automatic repeat request buffer; means for determining to transmit at least one coded transport block based on identifying at least two of the plurality of protocol data units for generating the at least one coded transport block; means for generating the at least one coded transport block based on the at least two of the of the plurality of protocol data units; and means for transmitting the at least one coded transport block. The apparatus may further comprise means for performing any example embodiment of the method of the second aspect.

According to a fifth aspect, an apparatus may comprise at least one processor and at least one memory including computer program code, the at least one memory and the computer code configured to, with the at least one processor, cause the apparatus at least to: receive at least one coded transport block generated based on a plurality of protocol data units, wherein the plurality of protocol data units is associated with at least one hybrid automatic repeat request process; and decode the at least one coded transport block to obtain the plurality of data packet units.

According to an example embodiment of the fifth aspect, the at least one memory and the computer code may be further configured to, with the at least one processor, cause the apparatus to: transmit an indication of an allocation of repetition bundle resources to the plurality of protocol data units, wherein the indication of the allocation of the repetition bundle resources indicates one of a plurality of repetition modes; and process the repetition bundle resources based on the allocation of repetition bundle resources to the plurality of protocol data units.

According to an example embodiment of the fifth aspect, the plurality of repetition modes may comprise at least one of: a first repetition mode comprising transmission of a first protocol data unit and/or a second protocol data unit without transmission of the at least one coded transport block, a second repetition mode comprising transmission of the at least one coded transport block generated based on a new transmission of the first protocol data unit and a new transmission of the second protocol data unit, a third repetition mode comprising transmission of the at least one coded transport block generated based on the new transmission of the first protocol data unit and a re-transmission of the second protocol data unit, or a fourth repetition mode comprising transmission of the at least one coded transport block generated based on a re-transmission of the first protocol data unit and the re-transmission of the second protocol data unit.

According to an example embodiment of the fifth aspect, the first protocol data unit may be associated with a first hybrid automatic repeat request process and the second protocol data unit may be associated with a second hybrid automatic repeat request process.

According to an example embodiment of the fifth aspect, the at least one memory and the computer code may be further configured to, with the at least one processor, cause the apparatus to: transmit an identifier of the first hybrid automatic repeat request process; and/or transmit an identifier of the second hybrid automatic repeat request processor.

According to an example embodiment of the fifth aspect, the at least one memory and the computer code may be further configured to, with the at least one processor, cause the apparatus to: transmit a re-transmission grant, wherein the re-transmission grant indicates one of a plurality of re-transmission modes and at least one identifier of a hybrid automatic repeat request process associated with the re-transmission grant; and receive the at least one coded transport block based on the re-transmission grant.

According to an example embodiment of the fifth aspect, the plurality of re-transmission modes may comprise at least one of: a first re-transmission mode comprising re-transmission of a first protocol data unit and/or a second protocol data unit, wherein the first protocol data unit and/or the second protocol data unit is associated with the hybrid automatic repeat request process, a second re-transmission mode comprising transmission of the at least one coded transport block generated based on the first protocol data unit associated with a first hybrid automatic repeat request process and the second protocol data unit associated with a second hybrid automatic repeat request process, or a third re-transmission mode comprising transmission of the at least one coded transport block generated based on the first protocol data unit associated with the hybrid automatic repeat request process and a new transmission of the second protocol data unit.

According to a sixth aspect, a method may comprise: receiving at least one coded transport block generated based on a plurality of protocol data units, wherein the plurality of protocol data units is associated with at least one hybrid automatic repeat request process; and decoding the at least one coded transport block to obtain the plurality of data packet units.

According to an example embodiment of the sixth aspect, the method may further comprise: transmitting an indication of an allocation of repetition bundle resources to the plurality of protocol data units, wherein the indication of the allocation of the repetition bundle resources indicates one of a plurality of repetition modes; and processing the repetition bundle resources based on the allocation of repetition bundle resources to the plurality of protocol data units.

According to an example embodiment of the sixth aspect, the plurality of repetition modes may comprise at least one of: a first repetition mode comprising transmission of a first protocol data unit and/or a second protocol data unit without transmission of the at least one coded transport block, a second repetition mode comprising transmission of the at least one coded transport block generated based on a new transmission of the first protocol data unit and a new transmission of the second protocol data unit, a third repetition mode comprising transmission of the at least one coded transport block generated based on the new transmission of the first protocol data unit and a re-transmission of the second protocol data unit, or a fourth repetition mode comprising transmission of the at least one coded transport block generated based on a re-transmission of the first protocol data unit and the re-transmission of the second protocol data unit.

According to an example embodiment of the sixth aspect, the first protocol data unit may be associated with a first hybrid automatic repeat request process and the second protocol data unit may be associated with a second hybrid automatic repeat request process.

According to an example embodiment of the sixth aspect, the method may further comprise: transmitting an identifier of the first hybrid automatic repeat request process; and/or transmitting an identifier of the second hybrid automatic repeat request processor.

According to an example embodiment of the sixth aspect, the method may further comprise: transmitting a re-transmission grant, wherein the re-transmission grant indicates one of a plurality of re-transmission modes and at least one identifier of a hybrid automatic repeat request process associated with the re-transmission grant; and receiving the at least one coded transport block based on the re-transmission grant.

According to an example embodiment of the sixth aspect, the plurality of re-transmission modes may comprise at least one of: a first re-transmission mode comprising re-transmission of a first protocol data unit and/or a second protocol data unit, wherein the first protocol data unit and/or the second protocol data unit is associated with the hybrid automatic repeat request process, a second re-transmission mode comprising transmission of the at least one coded transport block generated based on the first protocol data unit associated with a first hybrid automatic repeat request process and the second protocol data unit associated with a second hybrid automatic repeat request process, or a third re-transmission mode comprising transmission of the at least one coded transport block generated based on the first protocol data unit associated with the hybrid automatic repeat request process and a new transmission of the second protocol data unit.

According to a seventh aspect, a computer program may comprise instructions for causing an apparatus to perform at least the following: receiving at least one coded transport block generated based on a plurality of protocol data units, wherein the plurality of protocol data units is associated with at least one hybrid automatic repeat request process; and decoding the at least one coded transport block to obtain the plurality of data packet units. The computer program may further comprise instructions for causing the apparatus to perform any example embodiment of the method of the sixth aspect.

According to an eighth aspect, an apparatus may comprise means for receiving at least one coded transport block generated based on a plurality of protocol data units, wherein the plurality of protocol data units is associated with at least one hybrid automatic repeat request process; and means for decoding the at least one coded transport block to obtain the plurality of data packet units. The apparatus may further comprise means for performing any example embodiment of the method of the sixth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 11 illustrates an example of a method for transmitting data, according to an example embodiment; and FIG. 12 illustrates an example of a method for receiving data, according to an example embodiment.

Like references are used to designate like parts in the accompanying drawings.

DETAILED DESCRIPTION

Figure 1:
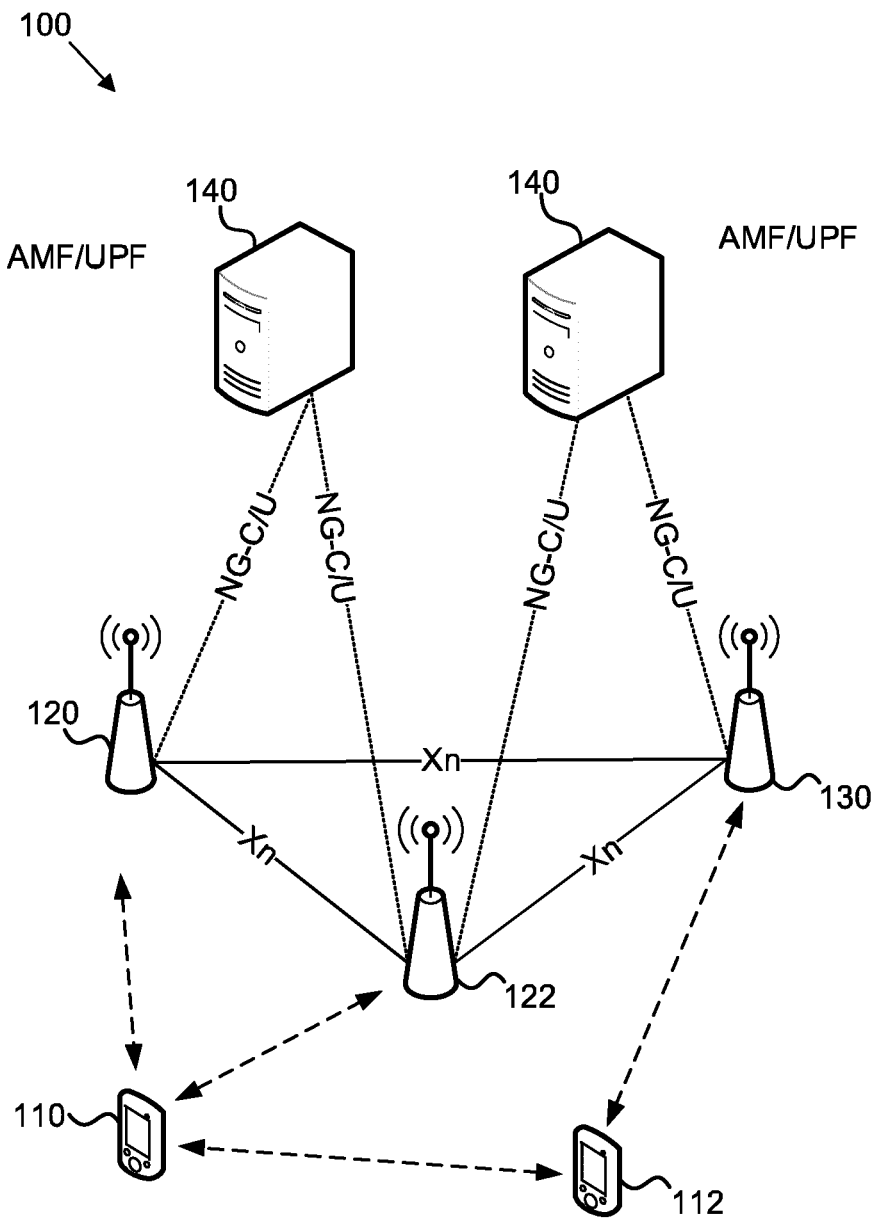
FIG. 1 illustrates an example of a communication network comprising network nodes and devices, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In various communication systems such as for example 3GPP 5G NR (New Radio), mechanisms such as HARQ re-transmission and/or blind repetition may be used to improve transmission reliability. When a transport block (TB) is generated for a physical resource by the MAC layer, for example via multiplexing data from a plurality of logical channels (LCHs), the transport block may be stored in a buffer of the HARQ process associated with physical transmission resources. When re-transmission is needed, for example when a re-transmission grant is assigned or when there is a repetition configured, the MAC layer may fetch the stored transport block from the HARQ buffer and instruct PHY to process it again.

Each physical resource may be dedicated to a transport block, either for new a transmission or a re-transmission. Also, a transmitter may need to handle a large number (e.g. 16) of transport blocks in parallel, corresponding to different HARQ processes. In order to transmit the high number of transport blocks in processing successfully, a large amount of physical resources may be needed. This may be undesirable both from resource-efficiency and latency perspectives.

Network coding (NC) may be leveraged as a tool to improve the operational efficiency. In network coding distinct data packets may be jointly coded together using random or predefined algorithms for certain resources, thus reducing the amount of radio resources that are needed for re-transmission. Example embodiments of the present disclosure provide mechanisms for a transmitter or receiver to apply network coding for HARQ operations, for example in the context of the 5G NR system. For example, a transmitter may determine whether joint coding should be applied to generate a network-coding transport block (NC-TB) for each of the available physical resources, or whether a transport block should be transmitted without joint coding with any other transport block. The receiver is enabled to process, for example to decode, the transmission by providing appropriate signaling information. Hence, the example embodiments of the present disclosure improve transmission reliability and/or efficiency by enabling HARQ operation in conjunction with network coding.

According to an example embodiment, a device may generate a plurality of protocol data units (PDU) for transmission. The PDUs may be stored in at least one HARQ buffer. The device may determine to transmit at least one coded transport block based on identifying a at least two of the PDUs for generating the coded transport block(s). The device may further generate and transmit the coded transport block(s). The PDUs may be associated with different HARQ processes and be optionally transmitted along with the coded transport block(s) in a repetition bundle, based on a re-transmission grant, or based on an uplink grant. HARQ process identifier(s) of the PDU(s) may be used to determine whether to transmit the original PDU(s) and/or the coded transport block(s), and to determine which PDUs to use for generating the coded transport block(s). Another device may receive the transmissions and decode the coded transport block(s) accordingly.

FIG. 1 illustrates an example of a communication network comprising network nodes and devices, according to an example embodiment. The communication network 100 may comprise one or more core network elements such as for example access and mobility management function (AMF) and/or user Plane function (UPF) 140, one or more base stations, represented by a gNB 120 and gNB 122. The communication network 100 may further comprise other base stations such as gNB 130. The communication network 100 may further comprise one or more devices, which may be also referred to as a user nodes or user equipment (UE). For example, the communication network 100 may comprise a UE 110 and a sidelink UE 112. UEs 110, 112 may communicate with one or more of the base stations via wireless radio channel(s). Furthermore, the UE 110 may communicate with (or via) the sidelink UE 112 over a sidelink connection, which may be a direct radio connection between the UE 110 and sidelink UE 112. Sidelink UE 112 may act as a link between the UE 110 and one or more of the base stations. Communications between UE 110, sidelink UE 112, gNB 120, gNB 122, and/or gNB 130 may be bidirectional. Hence, any of these devices may be configured to operate as a transmitter and/or a receiver.

The base stations may be configured to communicate with the core network elements over a communication interface, such as for example a control plane interface or a user plane interface NG-C/U. Base stations may be also called radio access network (RAN) nodes and they may be part of a radio access network between the core network and the UEs. Functionality of a base station may be distributed between a central unit (CU), for example a gNB-CU, and one or more distributed units (DU), for example gNB-DUs. Network elements AMF/UPF, gNB, gNB-CU, and gNB-DU may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

The communication network 100 may be configured for example in accordance with the 5th Generation digital cellular communication network, as defined by the 3rd Generation Partnership Project (3GPP). In one example, the communication network 100 may operate according to 3GPP 5G-NR (5G New Radio). It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

In a split architecture scenario, central unit of a base station may comprise a physical or logical node and may include functions such as for example transfer of user data, mobility control, radio access network sharing, positioning, session management, or the like, except for functions that may be allocated to the distributed unit(s). The central unit may be connected to the one or more distributed units over a communication interface, for example an F1 interface. The one or more distributed units may be physical or logical nodes that may be configured to provide a subset of base station functions, depending on how the functions are split between the central unit and the distributed unit(s). The distributed unit(s) may be controlled by the central unit through the communication interface. A base station may be connected to other radio access network nodes by another communication interface, for example an Xn interface. It is appreciated that network functionality described herein may be implemented at a gNB, or divided between a gNB-CU and a gNB-DU.

Figure 2:
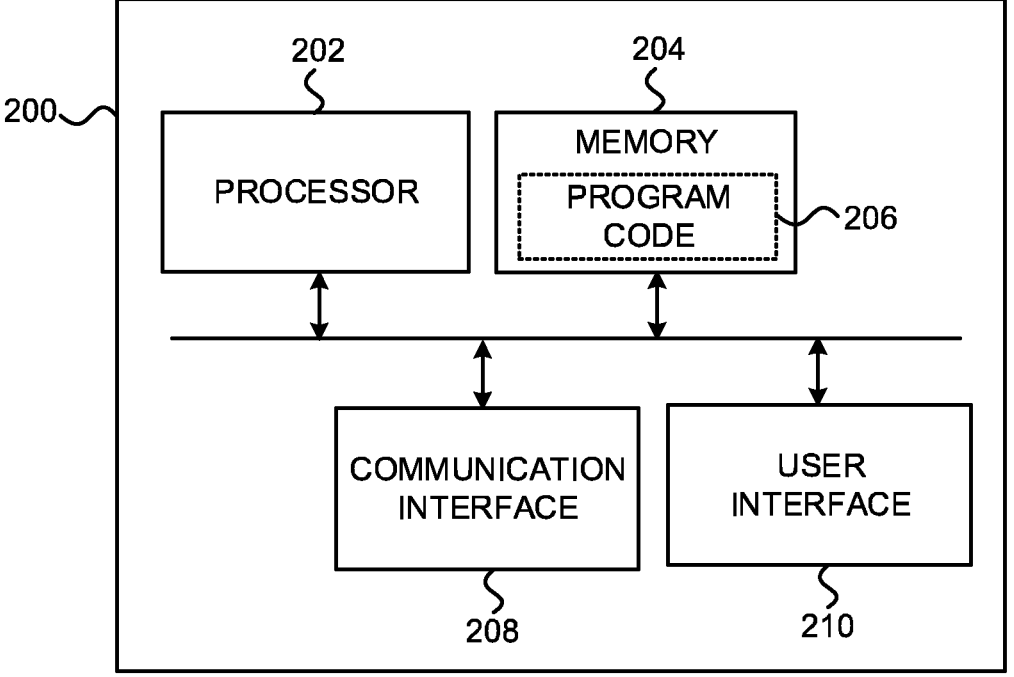
FIG. 2 illustrates an example of an apparatus configured to practice one or more example embodiments.

FIG. 2 illustrates an example embodiment of an apparatus 200, for example UE 110 or sidelink UE 112, or a network node such as for example gNB 120. The apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the at least one memory 204, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 200 comprises means for performing at least one method described herein. In one example, the means comprises the at least one processor 202, the at least one memory 204 including program code 206 configured to, when executed by the at least one processor, cause the apparatus 200 to perform the method.

The apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figure 3:
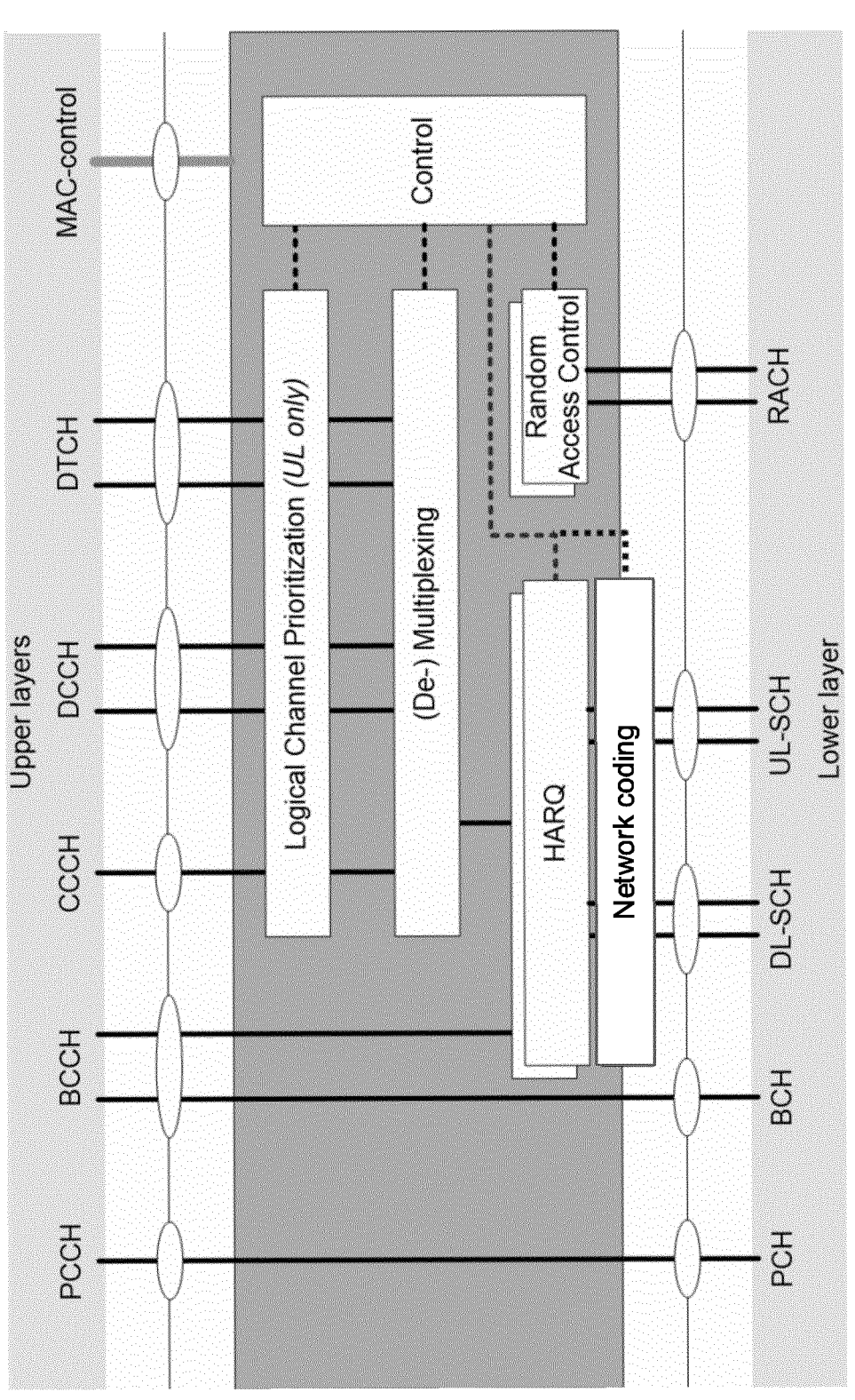
FIG. 3 illustrates an example of a MAC architecture with network coding functionality, according to an example embodiment.

FIG. 3 illustrates an example of a MAC architecture with network coding functionality, according to an example embodiment. The MAC layer may provide a mapping between logical channels of upper layer(s) and transport channels of a lower layer and handle multiplexing and demultiplexing of MAC service data units (SDU). The upper layer channels may comprise for example one or more of the following: paging control channel (PCCH), broadcast channel (BCCH), common control channel (CCCH), dedicated control channel (DCCH), or dedicated traffic channel (DTCH). The lower layer channels may comprise one or more of the following: paging channel (PCH), broadcast channel (BCH), downlink shared channel (DL-SCH), uplink shared channel (UL-SCH), or random access channel (RACH). The MAC layer may further comprise a logical channel prioritization function for uplink, and various control functions, as illustrated in FIG. 3.

Furthermore, the MAC layer may provide error correction functionality based on packet re-transmissions, for example according to hybrid automatic repeat request (HARQ) process(es). The HARQ function(s) may be followed by a network coding entity. The network coding entity may be configured to perform joint coding between two distinct MAC PDUs (transport blocks) of different HARQ processes to generate a network-coding transport block (NC-TB), before delivering the data to the lower layer (e.g. PHY) for further processing. The MAC PDUs involved in joint coding may be associated with either a new transmission or a re-transmission, as will be further described below. It is noted that even though example embodiments have been described using the MAC layer, MAC PDUs, and corresponding functionality as an example, the example embodiments may be alternatively applied at any suitable protocol layer(s) and to any suitable PDUs or transport blocks. Example embodiments may be also generalized to joint coding of more than two PDUs.

Figure 4:
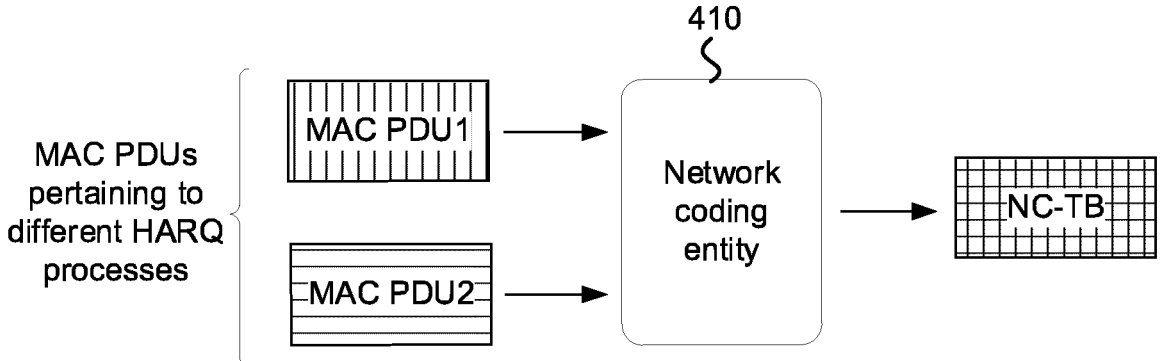
FIG. 4 illustrates an example of functionality of a network coding entity, according to an example embodiment.

FIG. 4 illustrates an example of functionality of a network coding entity, according to an example embodiment. The network coding entity 410 may take as input two or more MAC PDUs. The MAC PDUs may pertain to different HARQ processes. The MAC PDUs 1 and 2 may be stored at different HARQ buffers, for example at UE 110. The network coding entity 410 may code the MAC PDUs jointly to generate a network-coding transport block (NC-TB). The joint coding of the MAC PDUs may comprise applying a code to a combination, for example a concatenation, of the MAC PDUs 1 and 2. In general, a transmitter may determine to generate and/or transmit the NC-TB based on identifying at least two of the PDUs for generating the NC-TB. For example, the device may identify PDUs that are configured to be coded together to obtain the NC-TB.

Various coding methods may be applied to generate the NC-TB. A code may comprise a forward error correction (FEC) code, such as for example a product code, a Reed-Solomon code, or the like. Another option is to apply random linear network coding (RLNC). Alternatively, coding may comprise applying a bitwise function such as for example an exclusive-or (XOR) function to the PDUs. In general, joint coding of PDUs may comprise transforming the PDUs into a coded representation of the PDUs. The coded representation may be such that a receiver is enabled to restore the original PDUs by decoding the coded representation. Coding may or may not provide error correction capability. For example, XOR operation may provide diversity by transforming the PDUs into another representation. Error correction may be optionally provided by the lower layer(s). The size of the coded representation may be higher, lower, or equal to the original representation of the PDUs.

In general a transmitter, such as for example UE 110, may obtain a plurality of PDUs for transmission. For example, the MAC layer may build or generate the MAC PDUs (which may be passed on later to the PHY layer) based on data (MAC SDUs) from the upper layer logical channels. The transmitter may obtain the plurality of PDUs for transmission for example from one or more of the upper layer logical channels of FIG. 3. The transmitter may store the PDUs in at least one HARQ buffer. The transmitter may further jointly code the PDUs to obtain at least one NC-TB, which may be generally referred to a coded transport block. The transmitter may then transmit the at least one NC-TB. Alternatively, or additionally, the transmitter may transmit the MAC PDUs (or transport blocks corresponding to the MAC PDUs) without applying the joint coding between the PDUs. This enables to control the reliability of the transmission, for example to gradually increase the reliability along with configured repetitions or granted re-transmissions.

Figure 5:
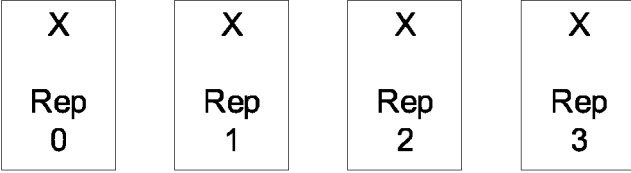
FIG. 5 illustrates examples of repetition bundles with and without network coding, according to an example embodiment.
Figure 5:
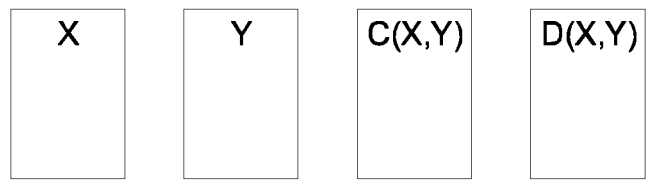

FIG. 5 illustrates examples of repetition bundles with and without network coding, according to an example embodiment. Repetition-based transmission may be applied for example on a physical uplink shared channel (PUSCH) or a physical downlink shared channel (PDSCH), or some other physical or logical transmission channel. For example, some resources within a repetition bundle may be used to transmit jointly coded transport blocks between two distinct MAC PDUs. The joint coding of the MAC PDUs may be applied in connection with at least one HARQ process.

For example, for a PUSCH/PDSCH repetition-bundle in 5G NR, a MAC PDU (e.g. MAC PDU X) may be transmitted K times autonomously, for example without an explicit request from another device, to improve reliability. However, a preconfigured number of repetitions may cause unnecessary traffic, for example when the MAC PDU X is correctly received well before the last repetition. When no network coding is applied a MAC PDU may form a transport block.

FIG. 5 provides also an example of an operational mode of a repetition bundle, where two distinct MAC PDUs X and Y are jointly processed in one bundle to achieve both high reliability and efficiency. The jointly coded MAC PDUs (joint coding between X and Y) are denoted as C(X,Y) and D(X,Y), referring to different coding mechanisms C and D jointly applied on the two MAC PDUs.

In case of Repetition mode 1, the UE 110, which is provided as an example of a transmitter, may transmit MAC PDU X (or Y) a configured number of times, in this example four times denoted by repetitions 'Rep 0' to 'Rep 3'. The UE 110 may therefore transmit original MAC PDU(s) without transmitting any NC-TBs.

In case of Repetition modes 2, 3, or 4, the repetition bundle may comprise MAC PDUs X and Y. The repetition bundle may further comprise NC-TBs C(X,Y) or D(X,Y). It is however also possible that the repetition bundle does not include one or more of the MAC PDUs X or Y, or the NC-TB(s) C(X,Y) and/or D(X,Y). For example, the NC-TB(s) may be transmitted without the original (not network coded) MAC PDUs X and/or Y.

Repetition mode 2 may comprise joint coding of X and Y, where both X and Y may be new transmissions, that is, data that has not been previously transmitted. Hence, transmission of the NC-TB(s) may comprise new transmission of both the MAC PDUs X and Y. The data of MAC PDUs X and Y may be therefore transmitted for the first time in a network coded transmission, which increases the probability of correctly receiving the MAC PDUs without re-transmission. Repetition mode 2 may therefore comprise transmission of NC-TB(s), which may be generated based on a new transmission of MAC PDU X and a new transmission of MAC PDU Y.

Repetition mode 3 may comprise joint coding of MAC PDUs X and Y, where X may be a new transmission, and where Y may be a re-transmission. For example, MAC PDU Y may have been transmitted before. However, the MAC PDU Y may be still pending in a HARQ buffer of the UE 110. Hence, transmission of the NC-TB(s) may comprise new transmission of MAC PDU X and re-transmission MAC PDU Y, or vice versa. Repetition mode 3 may therefore comprise transmission of NC-TB(s), which may be generated based on a new transmission of MAC PDU X and a re-transmission MAC PDU Y.

Repetition mode 4 may comprise joint coding of MAC PDUs X and Y, where both X and Y are re-transmissions. For example, both X and Y may be pending in their corresponding HARQ buffers at UE 110. Transmission of the NC-TB(s) may therefore comprise re-transmission of both the MAC PDUs X and Y. Repetition mode 4 may therefore comprise transmission of NC-TB(s), which may be generated based on re-transmission of MAC PDU X and re-transmission of MAC PDU Y.

It is noted that MAC PDUs X and Y may be associated with different HARQ processes. For example, MAC PDU X may be associated with a first HARQ process. MAC PDU Y may be associated with a second HARQ process. MAC PDU X may be therefore stored in a first HARQ buffer. MAC PDU Y may be stored in a second HARQ buffer. The first and second HARQ processes may be different HARQ processes. The first and second HARQ buffers may be different HARQ buffers.

Figures 6, 7:
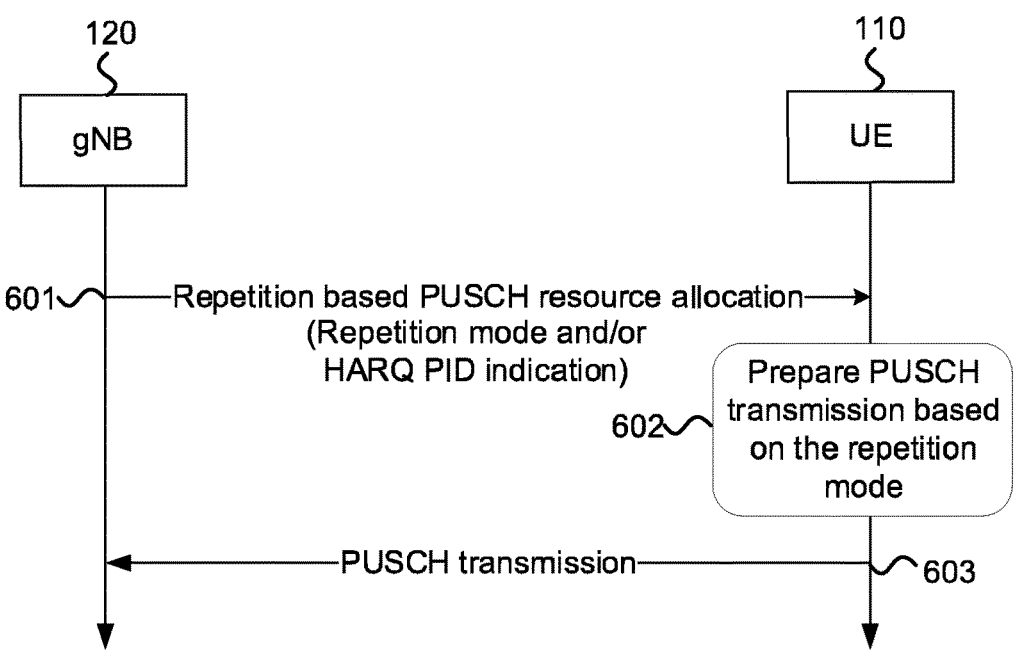
FIG. 6 illustrates an example of a configuration procedure for network coding based repetition, according to an example embodiment.
FIG. 7 illustrates an example of a configuration procedure for network coding based re-transmission, according to an example embodiment.

FIG. 6 illustrates an example of a configuration procedure for network coding based repetition, according to an example embodiment. Repetition related signaling or configuration information may be shared between devices, for example UE 110 and gNB 120. As discussed above, a repetition bundle may comprise a number of repetitive transmissions, wherein the number of repetitive transmissions is fixed before the first transmission of a repetition bundle.

At operation 601, the gNB 120 may transmit a repetition based resource allocation, for example a PUSCH resource allocation. The resource allocation may indicate to UE 110 the transmission resources for transmitting the MAC PDU(s) and/or NC-TB(s) of the repetition bundle. The resource allocation may comprise and indication of a (requested) repetition mode, for example any of the Repetition modes 1 to 4. The UE 110 may receive the indication of the repetition mode and configure transmission of the repetition bundle according to the indicated configuration.

The resource allocation may further comprise an indication of at least one HARQ process identifier (PID). For example, the gNB 120 may transmit to the UE 110 an identifier of a first HARQ process associated with MAC PDU X and/or an identifier of a second HARQ process associated with MAC PDU Y. Even though the repetition related signaling information may be provided along with the resource allocation, for example in a single resource allocation message, it is noted that similar information may be provided also by using other control information or control message(s).

In general, the gNB 120 may transmit an indication of an allocation of the repetition bundle resources to the MAC PDUs and/or the NC-TB(s). For example, the gNB 120 may indicate which resource(s) within the repetition bundle should be used for TB(s) carrying the original MAC PDUs X and Y or the NC-TB(s). In the example of FIG. 5, the first two resources in the repetition bundle are used for TBs carrying original MAC PDUs X and Y, while the remaining two resources in the repetition bundle are used for NC-TBs. It is however possible to configure the repetition bundle in a different way. For example, the first and the third resources within the repetition bundle could be used for TBs carrying the original MAC PDUs, while the second and the fourth resources within the repetition bundle could be used for NC-TB. Other possibilities are also not precluded. In general, gNB 120 may transmit and UE 110 may receive an indication of an allocation of repetition bundle resources to MAC PDUs X, MAC PDUs Y, and/or one or more NC-TBs. The indication of the allocation of the repetition bundle resources may indicate one of the repetition modes. The UE 110 may further determine to transmit the coded transport block based on the indicated one of the repetition modes.

As discussed above, the repetition mode may be signaled to the UE 110 by the network. Alternatively, whether to operate the repetition bundle in conjunction with network coding could be determined by the UE 110 itself, for example based on the data that has been mapped to the first resource of the repetition bundle. For instance, depending on the contents mapped to the MAC PDU (e.g. logical control channels (LCH), MAC control elements (CE), and/or presence of a signaling radio bearer (SRB)) prepared for the first resource of the repetition, the UE 110 may determine how to configure the remaining resources of the bundle. Control signaling may be embedded in the first transmission of the repetition bundle in order to inform the gNB 120 about the use of the remaining resources. In one example, if the first resource of the repetition bundle is determined to include prioritized data, the UE 110 may apply repetition to ensure such data can be transmitted with required reliability and latency.

The UE 110 may therefore determine the repetition mode locally at the UE 110. The used repetition mode may be determined for example based on the type of data content carried by the MAC PDU X and/or the MAC PDU Y. Different types of data content may be for example mapped to different repetition bundle configuration. The configuration to be used may be determined based on the type of PDU(s) received for transmission and the mapping. The mapping may be preconfigured at UE 110 or received from gNB 120.

At operation 602, the UE 110 may prepare transmission of the repetition bundle based on the repetition mode, for example on the PUSCH. The UE 110 may for example prepare the transport block(s) to be transmitted in each PUSCH transmission within the repetition bundle based on the indicated repetition mode. Preparation of the transmission may include generation of new PDU(s) based on the received data, fetching stored PDU(s) (e.g. from HARQ buffer(s)), and/or performing joint coding between PDUs.

At operation 603, the UE 110 may transmit the data, for example on the PUSCH. The UE 110 transmit MAC PDU X and/or MAC PDU Y without joint coding between them. Alternatively, or additionally, the UE 110 may transmit one or more NC-TBs generated based on joint coding of the MAC PDUs X and Y by one or more coding functions (C, D). Transmission of the data may be according to the indicated or determined repetition mode. Transmission of MAC PDUs without joint coding between them may be also referred to as uncoded transmission. It is however noted that even if network coding were not applied, the data corresponding to the uncoded MAC PDUs may be processed by one or more coding functions at lower layer(s).

Combining repetition bundle with network coding allows a proactive reliability boost with low latency. For example, there is no need to wait for a re-transmission grant. Also, radio efficiency is improved as more than one transport block may be transmitted across the bundle.

FIG. 7 illustrates an example of a configuration procedure for network coding based re-transmission, according to an example embodiment. When the gNB 120 fails to decode a transport block transmitted by UE 110, the gNB 120 may assign a re-transmission grant and ask the UE 110 to transmit the transport block again. The re-transmission grant may be associated with one or more HARQ processes, which may be indicated to the UE 110, for example in the re-transmission grant. However, the re-transmission may not be based on HARQ feedback. In order to proactively (without HARQ round-trip delay) and resource efficiently increase reliability of multiple MAC PDUs, whose packet delay budget might be as low as 0.5 ms, network coding based approach may be used. Packet delay budget (PDB) may comprise an upper bound for an acceptable delay for a PDU. With network coding based HARQ operation, the gNB 120 may transmit a re-transmission grant and instruct the UE 110 to transmit an NC-TB instead of waiting HARQ feedback. The NC-TB may be jointly coded across two distinct transport blocks. The gNB 120 may also provide re-transmission configuration information to UE 110. For example, a signaling field may indicate a re-transmission mode. Such field may be for example included in the DCI (downlink control information) that assigns the re-transmission grant. The field may be included to indicate which of one or more of the following re-transmission modes the UE 110 should take to generate transmission on the allocated re-transmission grant resource(s):

Re-transmission mode 1: the UE 110 may use the re-transmission grant to transmit transport block(s) stored in the indicated HARQ process. The transport block(s), or MAC PDU(s), may be transmitted without joint coding between MAC PDUs. Re-transmission mode 1 may therefore comprise re-transmission of a first protocol data unit, for example MAC PDU X, and/or a second protocol data unit, for example MAC PDU Y. MAC PDU X and/or MAC PDU Y may be associated with the indicated hybrid automatic repeat request process.

Re-transmission mode 2: the UE 110 may use the re-transmission grant to transmit coded (combined) version of multiple MAC PDUs stored in at least two HARQ processes. Re-transmission mode 2 may therefore comprise transmission of the NC-TB(s), which may be generated based on MAC PDU X and MAC PDU Y. MAC PDU X may be associated with a first HARQ process. MAC PDU Y may be associated with a second HARQ process.

Re-transmission mode 3: the UE 110 may use the re-transmission grant to transmit coded (combined) version of at least one MAC PDU stored in at least one HARQ process and at least one new transmission. Re-transmission mode 3 may therefore comprise transmission of the NC-TB(s), which may be generated based on MAC PDU X, which may be associated with a HARQ process, and new transmission of MAC PDU Y.

In Re-transmission modes 2 and 3, the UE 110 may generate NC-TB(s) for transmission. The gNB 120 may also provide an indication of the plurality of HARQ processes that are considered. For instance, with Re-transmission mode 2, the gNB 120 may indicate the HARQ processes, which the UE 110 should use to fetch the MAC PDUs for joint coding. An example of configuring re-transmission(s) on the PUSCH is illustrated in FIG. 7. It is however noted that similar process may be applied to any suitable transmission channel.

At operation 701, the gNB 120 may transmit a re-transmission grant. The re-transmission grant may be associated with a re-transmission mode. The gNB 120 may transmit an indication of the re-transmission mode, for example in the re-transmission grant. The re-transmission grant may be further associated with one or more HARQ processes. The gNB 120 may transmit an identifier the HARQ process(es), for example in the re-transmission grant. The UE 110 may receive the re-transmission grant, the indication of the re-transmission mode, and/or the identifier (or indication) of the HARQ process(es).

At operation 702, the UE 110 may prepare a transmission, for example on the PUSCH, based on the re-transmission grant mode and/or the indicated HARQ process identifier(s) (HARQ PID). Preparation of the transmission may comprise fetching the MAC PDU(s) from HARQ buffer(s) associated with the indicated HARQ process(es). The UE 110 may determine to transmit the NC-TB(s) based on the received (indicated) re-transmission mode and the identifier of the HARQ process. For example, the UE 110 may determined to jointly code certain PDUs based on the indicated re-transmission mode and the PDUs being associated with a HARQ identifier for which joint coding of PDUs is configured.

At operation 703, the UE 110 may re-transmit the data, for example on the PUSCH.

In case of Re-transmission mode 1, the indication of the re-transmission mode may comprise an indication of a first re-transmission mode. In response to receiving a re-transmission grant associated with the first re-transmission mode, the UE 110 may re-transmit MAC PDU(s) without joint coding between PDUs. The re-transmitted PDU(s) may be associated with the indicated HARQ process(es). The MAC PDU(s) may be therefore transmitted according to the first re-transmission mode.

In case of Retransmission mode 2, the indication of the re-transmission mode may comprise an indication of a second re-transmission mode. The re-transmission grant may be associated with a plurality of HARQ processes. The UE 110 may receive identifiers of the HARQ process(es) from the gNB 120. For example, with reference to FIG. 4, the MAC PDU 1 may be associated with a first HARQ process and MAC PDU 2 may be associated with a second HARQ process. Hence, the MAC PDUs 1 and 2 may be stored in different HARQ buffers at UE 110. In response to receiving a re-transmission grant associated with the second re-transmission mode, the UE 110 may transmit at least one NC-TB generated based on joint coding of between PDUs, for example the MAC PDUs 1 and 2. The at least one NC-TB may be therefore transmitted according to the second re-transmission mode.

In case of Re-transmission mode 3, the indication of the re-transmission mode may comprise an indication of a third re-transmission mode. The re-transmission grant may be associated with at least one HARQ process. As discussed above, the re-transmission mode 3 may comprise transmission of at least one NC-TB, where at least one of the jointly coded MAC PDUs is associated with the indicated HARQ process (re-transmitted MAC PDU) and where at least one of the jointly coded MAC PDUs is a new PDU. The jointly coded NC-TB may therefore comprise re-transmitted PDU(s) associated with the indicated HARQ process(es) and new PDU(s) that are to be transmitted for the first time. The UE 110 may generate and transmit the NC-TB(s) based on the indication of the third re-transmission mode and the indication of the associated HARQ process(es). The NC-TB(s) may be therefore transmitted according to the third re-transmission mode.

Figure 8:
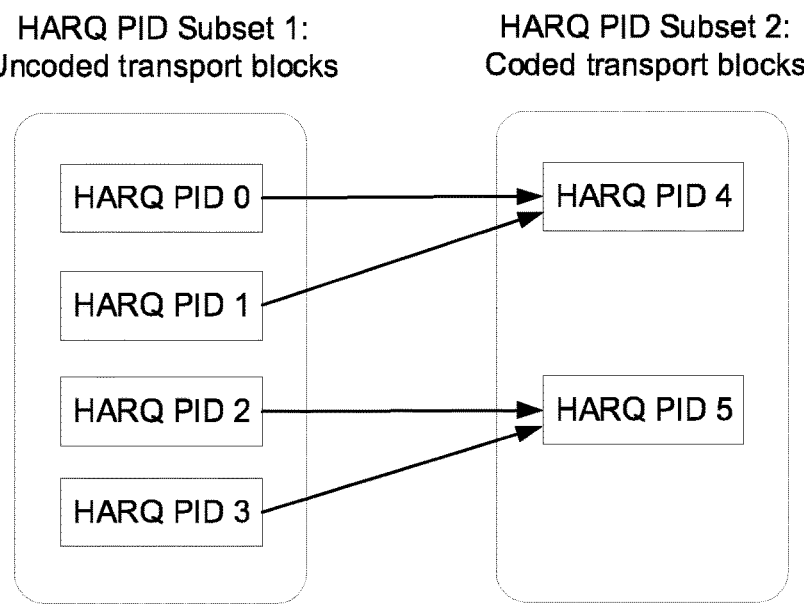
FIG. 8 illustrates an example of HARQ PID subsets, according to an example embodiment.

FIG. 8 illustrates an example of HARQ PID subsets, according to an example embodiment. In order to determine for which data the network coding is to be applied, the UE 110 may be configured with a HARQ process subset(s) for network coding transport blocks (NC-TBs). Similarly, the gNB 120 may be configured with the HARQ process subset(s) in order to detect and decode jointly coded transport block(s). Alternatively, to correctly decode an original transport block (MAC PDU) from the associated NC-TB, an association of the original transport block to the coded transport block may be indicated by UE 110. The mapping may be for example implicitly indicated by the associated HARQ PID. In one example, a plurality of HARQ PIDs (HARQ PID pool) may be divided into non-overlapping subsets. For example, HARQ PID Subset 1 may be associated with uncoded transport blocks. HARQ PID Subset 2 may be associated with network-coding transport blocks (NC-TB). In the example of FIG. 8, there are six HARQ PIDs in total, where HARQ PIDs 0, 1, 2, and 3 are grouped into Subset 1 for transmission of uncoded transport blocks, while the HARQ PID 4 and 5 are grouped into subset 2 for transmission of NC-TBs. The UE 110 may determine whether to use uncoded or network coded transmission based on the HARQ PID of a particular MAC PDU belonging to either Subset 1 or Subset 2.

According to another example, HARQ PIDs of the Subset 1 may be linked to HARQ PIDs of the Subset 2. For example, HARQ PIDs 0 and 1 may be linked to HARQ PID 4 to indicate that the NC-TB for resource with HARQ PID 4 should be generated based on joint coding between MAC PDUs in HARQ processes 0 and 1. Similarly, HARQ PID 5 may be linked to HARQ PIDs 2 and 3 to indicate that the NC-TB for resource with HARQ PID 5 should be generated based on joint coding between MAC PDUs in HARQ process 2 and 3. More generally, HARQ PID 4 may be linked to any two or more of HARQ PIDs 0 to 3 and the linked HARQ PIDs may be indicated to the UE 110, for example in an uplink grant transmitted by the gNB 120.

The HARQ PID subsets may be preconfigured or dynamically configured. In case of dynamic configuration, the gNB 120 may indicate the allocation of HARQ PIDs to uncoded or coded transmission to UE 110, for example in or along with the repetition resource allocation, the re-transmission grant, or the uplink grant. The links between the HARQ PIDs associated with uncoded and coded transmission may be similarly indicated to UE 110.

Figure 9:
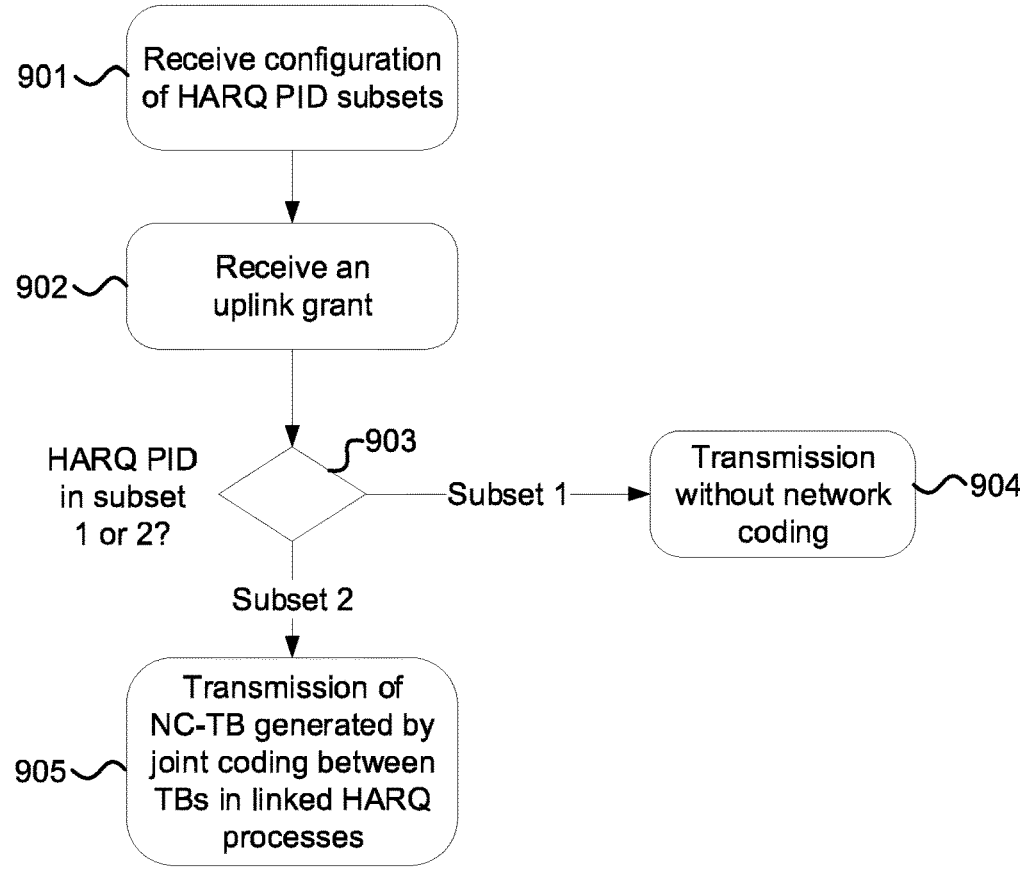
FIG. 9 illustrates an example of a method for determining whether to apply network coding based on HARQ PID subsets, according to an example embodiment.

FIG. 9 illustrates an example of a method for determining whether to apply network coding based on HARQ PID subsets, according to an example embodiment. Upon reception of an uplink grant, which represents a transmission grant in this example, from the gNB 120, the UE 110 may determine from which MAC PDUs to generate NC-TB(s) for transmission on the resource(s) allocated in the uplink grant. This example embodiment may also be used to identify whether uncoded MAC PDUs or coded TBs should be transmitted using the allocated resources in an implicit way, for example without explicit indication of a repetition mode or a re-transmission mode. For example, an uncoded MAC PDU may be transmitted if a HARQ PID in the Subset 1 of FIG. 8 is indicated, while a coded transport block may be transmitted if a HARQ PID in the Subset 2 is indicated.

At operation 901, the UE 110 may receive a configuration of the HARQ PID subsets. The configuration may be provided in any suitable signaling information or control message(s). The configuration may for example comprise a list of HARQ PIDs associated with either of the two subsets (uncoded or coded transmission). The gNB 120 may transmit the configuration to UE 110.

At operation 902, the UE 110 may receive an uplink grant. An uplink grant may comprise an indication of uplink transmission resources allocated to UE 110. The uplink grant may further indicate an identifier of a HARQ process belonging to a first set (subset) of HARQ process identifiers (HARQ PID). In response to reception of the uplink grant from the gNB 120, the UE 110 may determine from which MAC PDUs to generate NC-TB(s) for transmission on the allocated resource(s), as described below. Transmission of the MAC PDU(s) and/or NC-TB(s) may be therefore in response to receiving the uplink grant.

At operation 903, the UE 110 may determine whether a MAC PDU is associated with a HARQ PID belonging to Subset 1 (first set of HARQ PIDs) or Subset 2 (second set of HARQ PIDs). If the HARQ PID belongs to Subset 1, the UE 110 may move to operation 904 to transmit the PDU without network coding. However, if the HARQ PID belongs to Subset 2, the UE 110 may move to operation 905 to apply network coding. UE 110 may therefore determine to transmit coded transport block(s), in response to determining the received HARQ PID to belong to Subset 1.

At operation 905, the UE 110 may generate and transmit an NC-TB. The NC-TB may be generated by joint coding of MAC PDUs. For example, the UE 110 may check whether a HARQ PID included in Subset 2 is linked to multiple HARQ PIDs of Subset 1. Based on this the UE 110 may determine to use the linked transport blocks (MAC PDUs) to generate an NC-TB. However, according to an example embodiment the UE 110 may jointly code also MAC PDUs associated with HARQ PIDs of Subset 1, if these HARQ PIDs are linked to HARQ PIDs of Subset 2. The UE 110 may therefore determine to code MAC PDUs jointly based on the HARQ PIDs of the associated HARQ processes belonging to or being linked to the Subset 2, which may be associated with joint coding of MAC PDUs.

Figure 10:
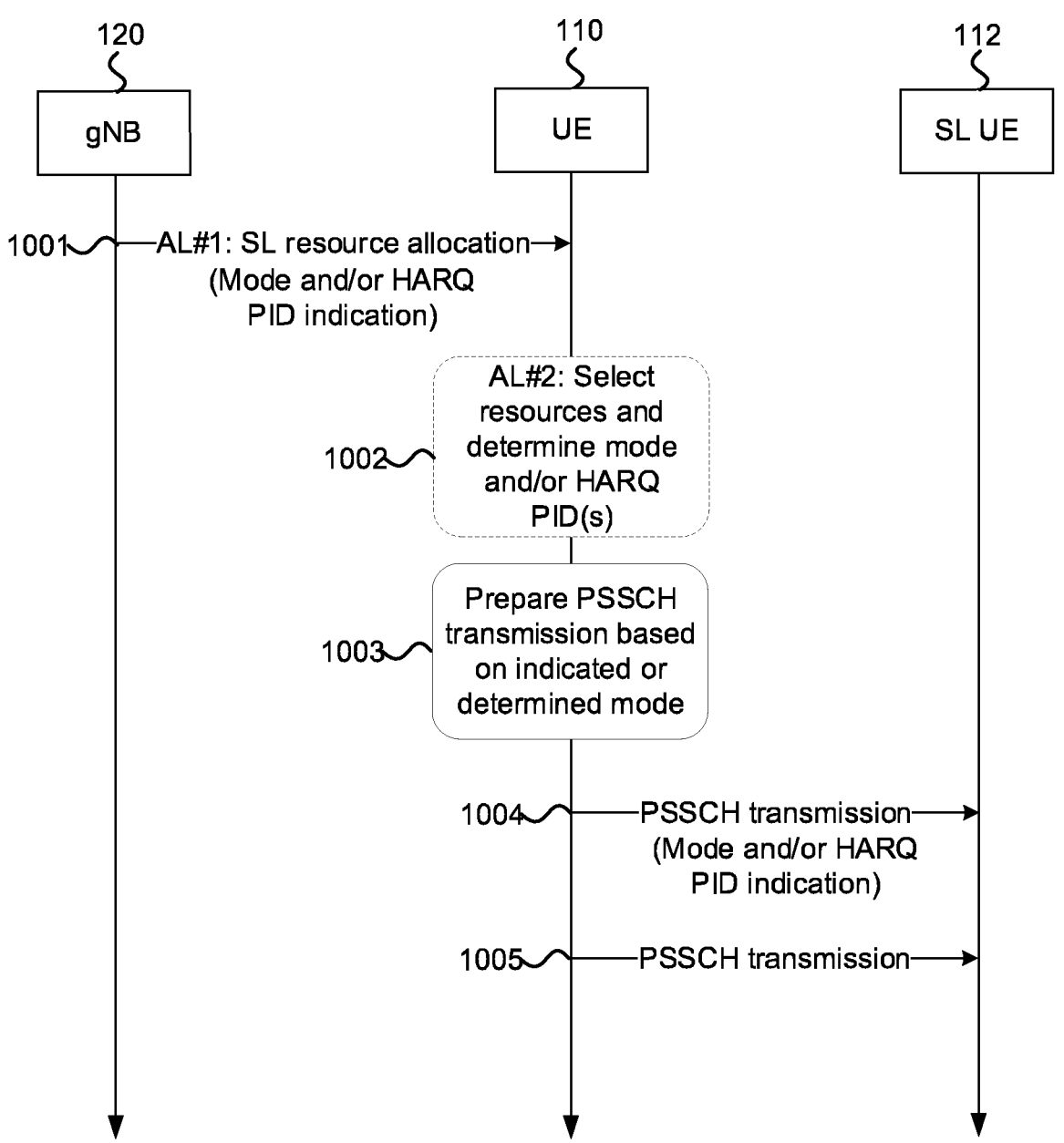
FIG. 10 illustrates an example of a procedure for applying network coding based HARQ operation in sidelink communication, according to an example embodiment.

FIG. 10 illustrates an example of a procedure for applying network coding based HARQ operation in sidelink communication, according to an example embodiment. Any of the above example embodiments may be applied also in a sidelink (SL) scenario, for example when the UE 110 (SL Tx UE) is to connected to gNB 120 (or another gNB) via sidelink UE 112 (SL Rx UE). For example, any information transmitted between the radio access network, for example gNB 120, and UE 110 may be alternatively transmitted over the sidelink connection. Depending on the resource allocation mode for the sidelink, the HARQ PID of the resource and how the transport block(s) should be generated, may be either determined or configured by the gNB 120, or determined or configured by UE 110.

At operation 1001, the gNB 120 may transmit a sidelink resource allocation to UE 110. According to a first alternative (AL #1), the gNB 120 may also transmit an indication of a mode of transmission and/or an indication of one or more HARQ PIDs associated with the sidelink resource allocation. The indication of the transmission mode may comprise an indication of the repetition mode or an indication of the re-transmission mode, as described above. Alternatively, the UE 110 may determine the mode and/or HARQ PID(s) itself at an optional operation 1002, without the indication(s) from the gNB 120.

At operation 1002, the UE 110 may select transmission resources based on the sidelink resource allocation. According to a second alternative (AL #2), the UE 110 may determine the mode of transmission and/or the HARQ PID(s) itself without the indication from gNB 120. The UE 110 may determine the repetition mode as described above, for example based the type of data content carried by the PDU(s). The re-transmission mode may be determined in a similar way.

At operation 1003, the UE 110 may prepare transmission of the (uncoded) MAC PDUs and/or coded transport block(s), for example similar to operations 602 or 702.

At operation 1004, the UE 110 may transmit the indication of the mode and/or the indication of the HARQ PID(s) over the sidelink connection to the sidelink UE 112. The indicated HARQ PID(s) may be associated with the MAC PDU(s) and/or coded transport block(s) (NC-TB) prepared for transmission at operation 1003. The indicated HARQ PID(s) may be associated with HARQ process(es) associated with the NC-TB(s).

At operation 1005, the UE 110 may transmit the (uncoded) MAC PDUs and/or coded transport block(s) over the sidelink connection based on the sidelink resource allocation. The transmission may be according to the indicated or determined mode. The procedure of FIG. 10 enables to take advantage of the various network coding methods in case of a sidelink connection.

FIG. 11 illustrates an example of a method for transmitting data, according to an example embodiment.

At 1101, the method may comprise generating a plurality of protocol data units for transmission.

At 1102, the method may comprise storing the plurality of protocol data units in at least one hybrid automatic repeat request buffer.

At 1103, the method may comprise determining to transmit at least one coded transport block based on identifying at least two of the plurality of protocol data units for generating the at least one coded transport block.

At 1104, the method may comprise generating the at least one coded transport block based on the at least two of the of the plurality of protocol data units.

At 1105, the method may comprise transmitting the at least one coded transport block.

FIG. 12 illustrates an example of a method for receiving data, according to an example embodiment.

At 1201, the method may comprise receiving at least one coded transport block generated based on a plurality of protocol data units, wherein the plurality of protocol data units is associated with at least one hybrid automatic repeat request process.

At 1202, the method may comprise decoding the at least one coded transport block to obtain the plurality of data packet units.

Further features of the methods directly result from the functionalities and parameters of the gNB 120, the UE 110, or the sidelink UE 112, as described in the appended claims and throughout the specification, and are therefore not repeated here. Different variations of the methods may be also applied, as described in connection with the various example embodiments.

An apparatus, for example the UE 110 or sidelink UE 112, or a network node such as gNB may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor inte-grated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. An apparatus, comprising:
at least one processor; and
at least one memory including computer program code;
wherein the at least one memory and the computer program code are configured to, with the at least one processor, cause the apparatus at least to:
generate a plurality of protocol data units for transmission;
store the plurality of protocol data units in at least one hybrid automatic repeat request buffer;
determine to transmit at least one coded transport block by combining at least two of the plurality of protocol data units, wherein the determination is based on one of:
receiving a re-transmission grant that indicates one of a plurality of re-transmission modes and comprises a first identifier of a hybrid automatic repeat request process associated with the re-transmission grant, and
receiving a transmission grant that comprises a second identifier of a hybrid automatic repeat request process and, in response determining that the second identifier belongs to a first set of hybrid automatic repeat request process identifiers;
generate the at least one coded transport block based on the at least two of the plurality of protocol data units; and
transmit the at least one coded transport block.

2. The apparatus according to claim 1, wherein the at least one memory and the computer program code are further configured to, with the at least one processor, cause the apparatus to:
receive an indication of an allocation of repetition bundle resources for the plurality of protocol data units, wherein the indication of the allocation of the repetition bundle resources indicates one of a plurality of repetition modes; and
determine to transmit the at least one coded transport block based on the indicated one of the plurality of repetition modes.

3. The apparatus according to claim 2, wherein the plurality of repetition modes comprises at least one of:
a first repetition mode comprising transmission of a first protocol data unit and a second protocol data unit without transmission of the at least one coded transport block, wherein the plurality of protocol data units includes the first protocol data unit and the second protocol data unit,
a second repetition mode comprising transmission of the at least one coded transport block generated based on a new transmission of the first protocol data unit and a new transmission of the second protocol data unit, a third repetition mode comprising transmission of the at least one coded transport block generated based on the new transmission of the first protocol data unit and a re-transmission the second protocol data unit, and a fourth repetition mode comprising transmission of the at least one coded transport block generated based on the re-transmission of the first protocol data unit and the re-transmission of the second protocol data unit.

4. The apparatus according to claim 3, wherein the first protocol data unit is stored in a first hybrid automatic repeat request buffer and the second protocol data unit is stored in a second hybrid automatic repeat request buffer, and wherein the first protocol data unit is associated with a first hybrid automatic repeat request process and the second protocol data unit is associated with a second hybrid automatic repeat request process.

5. The apparatus according to claim 4, wherein the at least one memory and the computer program code are further configured to, with the at least one processor, cause the apparatus to:

receive an identifier of the first hybrid automatic repeat request process; and receive an identifier of the second hybrid automatic repeat request process.

6. The apparatus according to claim 1, wherein the determination is based on receiving the re-transmission grant, and wherein the plurality of re-transmission modes comprises at least one of:

a first re-transmission mode comprising re-transmission of at least one of a first protocol data unit and a second protocol data unit of the plurality of protocol data units, wherein the at least one of the first protocol data unit and the second protocol data unit is associated with the hybrid automatic repeat request process associated with the first identifier, a second re-transmission mode comprising transmission of the at least one coded transport block generated based on the first protocol data unit associated with a first hybrid automatic repeat request process and the second protocol data unit associated with a second hybrid automatic repeat request process, and a third re-transmission mode comprising transmission of the at least one coded transport block generated based on the first protocol data unit associated with the hybrid automatic repeat request process associated with the first identifier and new transmission of the second protocol data unit.

7. The apparatus according to claim 1, wherein the determination is based on receiving the transmission grant, and wherein the at least one memory and the computer program code are further configured to, with the at least one processor, cause the apparatus to:

generate the at least one coded transport block based on a first protocol data unit and a second protocol data unit of the plurality of protocol data units, wherein the first protocol data unit is associated with an identifier of a first hybrid automatic request process and the second protocol data unit is associated with an identifier of a second hybrid automatic request process, and wherein the identifier of the first hybrid automatic request process and the identifier of the second hybrid automatic request process belong to a second set of hybrid automatic repeat request process identifiers that is linked to the second set of hybrid automatic request process identifiers.

8. The apparatus according to claim 7, wherein the at least one memory and the computer program code are further configured to, with the at least one processor, cause the apparatus to at least one of:

transmit an indication of a repetition mode over a sidelink connection, transmit an indication of a re-transmission mode over the sidelink connection, and transmit the identifier of the hybrid automatic repeat request process associated with the second set of hybrid automatic repeat request process identifiers associated with the at least one coded transport block over the sidelink connection.

9. An apparatus, comprising:

at least one processor; and at least one memory including computer program code;

wherein the at least one memory and the computer program code are configured to, with the at least one processor, cause the apparatus at least to:

transmit a re-transmission grant, wherein the re-transmission grant indicates one of a plurality of re-transmission modes and at least one identifier of a hybrid automatic repeat request process associated with the re-transmission grant;

in response to the transmitted re-transmission grant, receive at least one coded transport block generated based on a plurality of protocol data units, wherein the plurality of protocol data units is associated with the hybrid automatic repeat request process; and decode the at least one coded transport block to obtain the plurality of protocol data units.

10. The apparatus according to claim 9, wherein the at least one memory and the computer program code are further configured to, with the at least one processor, cause the apparatus to:

transmit an indication of an allocation of repetition bundle resources for the plurality of protocol data units, wherein the indication of the allocation of the repetition bundle resources indicates one of a plurality of repetition modes; and process the repetition bundle resources based on the allocation of the repetition bundle resources for the plurality of protocol data units.

11. The apparatus according to claim 10, wherein the plurality of repetition modes comprises at least one of:

a first repetition mode comprising transmission of at least one of a first protocol data unit and a second protocol data unit without transmission of the at least one coded transport block, wherein the plurality of protocol data units includes the first protocol data unit and the second protocol data unit, a second repetition mode comprising transmission of the at least one coded transport block generated based on a new transmission of the first protocol data unit and a new transmission of the second protocol data unit, a third repetition mode comprising transmission of the at least one coded transport block generated based on the new transmission of the first protocol data unit and a re-transmission of the second protocol data unit, and a fourth repetition mode comprising transmission of the at least one coded transport block generated based on a re-transmission of the first protocol data unit and the re-transmission of the second protocol data unit.

12. The apparatus according to claim 11, wherein the first protocol data unit is associated with a first hybrid automatic repeat request process and the second protocol data unit is associated with a second hybrid automatic repeat request process.

13. The apparatus according to claim 12, wherein the at least one memory and the computer program code are further configured to, with the at least one processor, cause the apparatus to:

transmit an identifier of the first hybrid automatic repeat request process; and transmit an identifier of the second hybrid automatic repeat request process.

14. The apparatus according to claim 9, wherein the plurality of re-transmission modes comprises at least one of:

a first re-transmission mode comprising re-transmission of at least one of a first protocol data unit and a second protocol data unit of the plurality of protocol data units, wherein the at least one of the first protocol data unit and the second protocol data unit is associated with the hybrid automatic repeat request process associated with the re-transmission grant, a second re-transmission mode comprising transmission of the at least one coded transport block generated based on the first protocol data unit associated with a first hybrid automatic repeat request process and the second protocol data unit associated with a second hybrid automatic repeat request process, or a third re-transmission mode comprising transmission of the at least one coded transport block generated based on the first protocol data unit associated with the hybrid automatic repeat request process associated with the re-transmission and a new transmission of the second protocol data unit.

15. A method, comprising:

generating, by an apparatus, a plurality of protocol data units for transmission;

storing, by the apparatus, the plurality of protocol data units in at least one hybrid automatic repeat request buffer;

determining, by the apparatus, to transmit at least one coded transport block by combining at least two of the plurality of protocol data units, wherein the determination is based on one of:

receiving a re-transmission grant that indicates one of a plurality of re-transmission modes and comprises a first identifier of a hybrid automatic repeat request process associated with the re-transmission grant, and receiving a transmission grant that comprises a second identifier of a hybrid automatic repeat request process and, in response determining that the second identifier belongs to a first set of hybrid automatic repeat request process identifiers;

generating, by the apparatus, the at least one coded transport block based on the at least two of the plurality of protocol data units; and transmitting, by the apparatus, the at least one coded transport block.

16. A method, comprising:

transmitting a re-transmission grant, wherein the re-transmission grant indicates one of a plurality of re-transmission modes and at least one identifier of a hybrid automatic repeat request process associated with the re-transmission grant;

in response to the transmitted re-transmission grant, receiving, by an apparatus, at least one coded transport block generated based on a plurality of protocol data units, wherein the plurality of protocol data units is associated with the hybrid automatic repeat request process; and decoding, by the apparatus, the at least one coded transport block to obtain the plurality of protocol data units.

* * * * *